United States Patent
Matsui

(10) Patent No.: US 6,956,916 B1
(45) Date of Patent: Oct. 18, 2005

(54) DELAYED DECISION FEEDBACK SEQUENCE ESTIMATION DIVERSITY RECEIVER

(75) Inventor: Hitoshi Matsui, Tokyo (JP)

(73) Assignee: NEC Corporation, Tokyo (JP)

( * ) Notice: Subject to any disclaimer, the term of this patent is extended or adjusted under 35 U.S.C. 154(b) by 762 days.

(21) Appl. No.: 09/680,469

(22) Filed: Oct. 6, 2000

(30) Foreign Application Priority Data

Oct. 6, 1999 (JP) ................................ 11/285068

(51) Int. Cl.⁷ ............................................. H04B 7/10
(52) U.S. Cl. ................. 375/347; 375/340; 375/233; 375/326; 342/375
(58) Field of Search ................ 375/347, 346, 375/326, 340, 303, 233, 232, 100; 342/375

(56) References Cited

U.S. PATENT DOCUMENTS

| | | | | |
|---|---|---|---|---|
| 5,127,025 A | * | 6/1992 | Okanoue | 375/232 |
| 5,260,711 A | * | 11/1993 | Sterzer | 342/375 |
| 5,684,836 A | * | 11/1997 | Nagayasu et al. | 375/326 |
| 6,404,827 B1 | * | 6/2002 | Uesugi | 375/340 |
| 6,650,702 B1 | * | 11/2003 | Steele | 375/233 |

FOREIGN PATENT DOCUMENTS

| | | |
|---|---|---|
| JP | 2-149023 A | 6/1990 |
| JP | 7-212299 | 8/1995 |
| JP | 8-172422 A | 7/1996 |
| JP | 9-51294 | 2/1997 |
| JP | 11-8573 | 1/1999 |
| JP | 11-225100 A | 8/1999 |
| JP | 11-225101 A | 8/1999 |

* cited by examiner

*Primary Examiner*—Shuwang Liu
*Assistant Examiner*—Eva Zheng
(74) *Attorney, Agent, or Firm*—Sughrue Mion, PLLC

(57) ABSTRACT

A delayed decision feedback sequence estimation diversity receiver includes a section for extracting a plurality of reception signals by using a plurality of antennas when estimating a transmission signal from reception signals having undergone transmission path distortion, a section for combining impulse response sequences in transmission paths while canceling delayed wave components having the largest amplitudes in delayed wave component sequences in impulse response sequences in the respective transmission paths, and a section for performing signal estimation on the basis of a new impulse response sequence generated by combining the impulse response sequences. A delayed decision feedback sequence estimation method is also disclosed.

6 Claims, 6 Drawing Sheets

DELAYED DECISION FEEDBACK SEQUENCE ESTIMATION DIVERSITY RECEIVER

BACKGROUND OF THE INVENTION

1. Field of the Invention

The present invention relates to a DDFSE (Delayed Decision Feedback Sequence Estimator) for estimating a transmission signal from a signal having undergone transmission path distortion caused by frequency selective fading due to a multipath effect in a radio channel in high-speed digital communication and, more particularly, to a delayed decision feedback sequence estimation diversity receiver which improves its signal estimation ability by combining antenna diversity with a DDFSE.

2. Description of the Prior Art

As a conventional apparatus designed to determine an optimal reception timing so as to estimate a transmission signal from reception signals having undergone transmission path distortion by using a DDFSE, the delayed decision feedback sequence estimation receiver disclosed in Japanese Unexamined Patent Publication No. 11-8573 is known.

The DDFSE is a signal estimator which has the merits of both an MLSE (Maximum Likelihood Sequence Estimator) having high signal estimation ability and a DFE (Decision Feedback Equalizer) with a small computation amount.

FIG. 1 is a block diagram showing the arrangement of a conventional DDFSE with a timing control function.

Assume that a reception signal 201 is a complex baseband signal expressed in a two-dimensional form. A transmission path estimator 202 is a block for obtaining the characteristics of a transmission path in the form of an impulse response. In general, the transmitting side sends a training signal before transmission of data, and the receiving side receives the training signal having undergone transmission path distortion, thereby obtaining transmission path characteristics.

An estimation region detector 203 performs a computation to find the timing at which the signal estimation ability is maximized. A DDFSE 204 performs signal estimation on the basis of the impulse response sequence obtained by the transmission path estimator 202 and the optimal timing obtained by the estimation region detector 203.

If the impulse response sequence obtained by the transmission path estimator 202 has undergone transmission path distortion, it has a temporally wide waveform like the one shown in FIG. 2. In this case, this signal is expressed in the form of a discrete signal sampled at a symbol period T of the transmission signal. FIG. 2 shows how the distortion spreads over a time 6T (signal components a2, a3, and a6 to a10 are not shown because their amplitudes are regarded as 0).

Assume that the DDFSE with the timing control function is configured to perform transmission path estimation in 11 symbol periods. More specifically, the DDFSE performs signal estimation equivalent to an MLSE computation in the first three symbol periods, and cancels a component corresponding to the succeeding three symbol periods by a computation equivalent to a DFE computation.

The estimation region detector 203 can find an optimal timing by the following computation.

Let P be the power component used for signal estimation, which falls within a 3-symbol range (MLSE region), Q be the power component to be canceled, which falls within a 3-symbol range (DFE region), and R be the power in the remaining 5-symbol range (outside the estimation region). In this case, as P increases, the signal estimation ability increases. Q is irrelevant to the signal estimation ability because it is canceled. As R increases, the signal estimation ability decreases. As an evaluation function, we define:

$$Z=P/R \tag{1}$$

The signal estimation ability is maximized at the timing at which Z of equation (1) is maximized.

In general, an impulse response in a transmission path can be obtained accurately only within certain limits on the receiving side owing to the influences of noise and computation errors. For this reason, the signal component in the DFE region which should be completely canceled ideally is not completely canceled and left as a distortion component. This phenomenon becomes noticeable as the signal component in the MLSE region decreases and the signal component in the DFE region increases.

A decision feedback loop exists in the DDFSE. Once an error is made in signal estimation, therefore, the erroneous estimation result circulates within the loop, and a burst-like error called error propagation may occur. This error propagation is likely to occur as the component in the DFE region becomes large. In order to cope with this situation, the evaluation function expressed by equation (1) must be modified to determine the timing at which higher signal estimation ability can be obtained. To this end, we define an evaluation function given by:

$$Z=P/(R+\alpha Q) \tag{2}$$

In equation (2), the coefficient $\alpha$ is a coefficient determined in accordance with the computation precision of an impulse response.

In the transmission path impulse response sequence shown in FIG. 2., the timings represented by:

$$P=(a0)^2+(a1)^2+(a2)^2 \tag{3}$$

$$Q=(a3)^2+(a4)^2+(a5)^2 \tag{4}$$

$$R=(a6)^2+(a1)^2+(a8)^2+(a9)^2+(a10)^2 \tag{5}$$

are obtained as optimal timings for signal estimation by using either equation (1) or (2).

If signal components that are received with delays are larger than other components as shown in FIG. 3, the timings obtained by equations (1) and (2) may differ from each other. In using equation (2), the timings are matched to delayed components that are received with delays by adjusting the coefficient a as per:

$$P=(a3)^2+(a4)^2+(a5)^2 \tag{6}$$

$$Q=(a6)^2+(a7)^2+(a8)^2 \tag{7}$$

$$R=(a9)^2+(a10)^2+(a0)^2+(a1)^2+(a2)^2 \tag{8}$$

This is because the estimation ability can be improved by performing signal estimation using a4 and a5 while regarding a0 and a1 as distortion components rather than by performing signal estimation using a0 and a1 with small amplitudes.

FIG. 4 shows the arrangement of this estimation region detector 203.

A power calculator 701 obtains the power level of each symbol, which is the square value (the sum of the square value of a real part and the square value of an imaginary part) of each symbol, of the complex impulse response sequence output from the transmission path estimator 202, and inputs the respective power levels to shift registers 702a to 702j.

An adder 703 obtains a power value P of the signal component in the MLSE region. An adder 704 obtains a power value Q of the signal component in the DFE region. An adder 705 obtains a power value R of a signal component outside the estimation region for the DDFSE 204.

Equations (3) and (6) are calculated by the adder 703. Equations (4) and (7) are calculated by the adder 704. Equations (5) and (8) are calculated by the adder 705.

The power values P, Q, and R obtained by the adders 703, 704, and 705 are used by an evaluation function calculator 706 to perform a computation based on equation (2). The evaluation function calculator 706 calculates equation (2) over 11 symbol periods, and detects the timing at which the value of Z is maximized. The evaluation function calculator 706 then outputs this timing to the DDFSE 204.

In this manner, the DDFSE with the timing control function obtains the timing for signal estimation by using an evaluation function like equation (2), thereby obtaining an optimal timing for the DDFSE.

However, the following problem arises in the prior art described above.

In a transmission path impulse response sequence like the one shown in FIG. 3, if a0 and a1 are received in the MLSE region as optimal timings, a4 and a5 received in the DFE region are canceled by a0 and a1 having small amplitudes. At this time, if a slight error is included in a0 or a1, the error is amplified when a4 and a5 are canceled, resulting in a deterioration in signal estimation ability.

If the values of a4 and a5 are large, the probability of occurrence of error propagation, i.e., continuous occurrence of errors upon occurrence of an error in signal estimation, increases. This also leads to a deterioration in signal estimation ability.

If a4 and a5 are received in the MLSE region, since a0 and a1 are received in neither the MLSE region nor the DFE region, these values are not effectively used for signal estimation and treated as distortions. This becomes a factor that degrades the signal estimation ability. That is, high signal estimation ability can be obtained by selecting neither of the former timing and the latter timing.

When a relatively large power component is set in the DFE region, as shown in FIG. 2, error propagation occurs more easily than when a large power component is not set in the DFE region. Therefore, a deterioration in signal estimation ability cannot be avoided.

SUMMARY OF THE INVENTION

The present invention has been made in consideration of the above situation in the prior art, and has as its object to provide a delayed decision feedback sequence estimation diversity receiver which can obtain high signal estimation ability.

In order to achieve the above object, according to the first aspect of the present invention, there is provided a delayed decision feedback sequence estimation diversity receiver characterized in that signals are received by two or more antennas, impulse response sequences in the respective transmission paths are obtained from the respective reception signals, components having the largest amplitude values among delayed wave components that are received with delays in these impulse response sequences are detected, and the impulse response sequences are combined so as to cancel the detected delayed wave components to generate a new impulse response sequence.

According to the second aspect of the present invention, there is provided a delayed decision feedback sequence estimation diversity receiver characterized in that signals are received by using two or more antennas, and the respective reception signals are combined so as to cancel components having the largest amplitude values among delayed wave components received with delays, thereby generating a new reception signal.

According to the third aspect of the present invention, there is provided a delayed decision feedback sequence estimation diversity receiver characterized in that signal estimation is performed by receiving a newly generated impulse response sequence and a newly generated reception signal and performing a computation for delayed decision feedback sequence estimation.

As is obvious from the respective aspects described above, according to the delayed decision feedback sequence estimation diversity receiver of the present invention, the overall power of delayed wave components is decreased by canceling components having the largest amplitudes among delayed wave components which cause a deterioration in signal estimation in a DDFSE by using a delayed wave canceler.

As a consequence, the power of delayed wave components which cause a deterioration in the DDFSE decreases, and hence the signal estimation ability of the DDFSE can be improved.

The above and many other objects, features and advantages of the present invention will become manifest to those skilled in the art upon making reference to the following detailed description and accompanying drawings in which preferred embodiments incorporating the principle of the present invention are shown by way of illustrative examples.

DETAILED DESCRIPTION OF THE PREFERRED EMBODIMENT

A preferred embodiment of the present invention will be described below with reference to the accompanying drawings.

Figure 5:
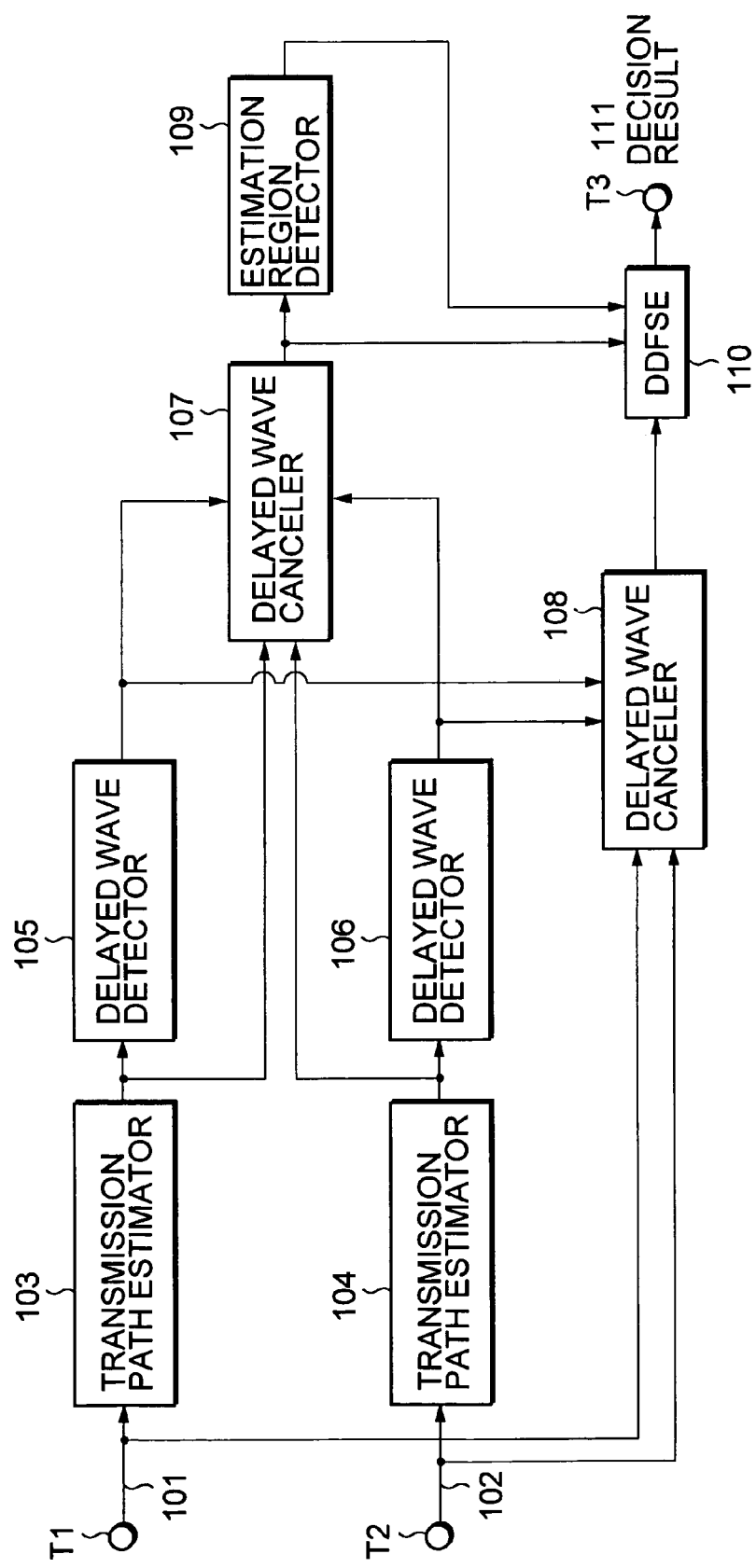
FIG. 5 is a block diagram showing a delayed decision feedback sequence estimation diversity receiver according to an embodiment of the present invention.

FIG. 5 is a block diagram showing the arrangement of a delayed decision feedback sequence estimation diversity receiver according to an embodiment of the present invention.

Referring to FIG. 5, the delayed decision feedback sequence estimation diversity receiver includes transmission path estimators 103 and 104 for respectively obtaining transmission path complex impulse response sequences from complex baseband reception signals 101 and 102 input through input terminals T1 and T2 and received by two independent antennas.

The delayed decision feedback sequence estimation diversity receiver of the present invention includes delayed wave detectors 105 and 106 for detecting the positions and magnitudes of components having the largest amplitudes among delayed wave components from the complex impulse response sequences respectively obtained by the transmission path estimators 103 and 104, a delayed wave canceler 107 for outputting an impulse response sequence obtained by canceling a component having the largest amplitude among delayed wave component sequences in the impulse response sequences output from the transmission path estimators 103 and 104 on the basis of the output signals from the delayed wave detectors 105 and 106, and a delayed wave canceler 108 for outputting a complex baseband reception signal obtained by canceling a component having the largest amplitude among delayed wave components in the reception signals input through the input terminals T1 and T2.

The delayed decision feedback sequence estimation diversity receiver also includes an estimation region detector 109 for determining an optimal timing for signal estimation from the impulse response sequence output from the delayed wave canceler 107, and a DBFSE 110 for performing signal estimation by receiving the output signals from the delayed wave canceler 107, estimation region detector 109, and delayed wave canceler 108.

The overall operation of this embodiment will be described next with reference to the arrangement shown in FIG. 5.

In this case, a 11-bit pseudo-random code is used as a training signal to allow the transmission path estimators 103 and 104 to obtain impulse response sequences based on multipath distortion in transmission paths during a 11-symbol period. As regions that can be estimated by the DDFSE (Delayed Decision feedback Sequence Estimator) 110, a maximum likelihood sequence estimation region (MLSE region) and decision feedback equalization region (DFE region), each corresponding to three symbols, will be described below.

A transmission path is estimated on the transmitting side when a training signal is transmitted. The training signal generated from a 11-bit pseudo-random code on the transmitting side is input as the reception signal 101 through the input terminal T1. The transmission path estimator 103 obtains an impulse response sequence in the transmission path by performing a correlation computation between the reception signal 101 and a 11-bit pseudo-random code identical to that on the transmitting side.

As the 11-bit pseudo-random code, a Barker code (+1, +1, +1, −1, −1, −1, +1, −1, −1, +1, −1) is used, and the received training signal is represented by r(n). In this case, an output signal h(n) from the transmission path estimator 103 is given by $$h(n) = r(n-10) + r(n-9) + r(n-8) - r(n-7) - r(n-6) - r(n-5) + r(n-4) - r(n-3) - r(n-2) + r(n-1) - r(n) \quad (9)$$

where n is an integer having a symbol period.

This output signal h(n) becomes an impulse response sequence in the transmission path. Since a baseband reception signal is generally a two-dimensional signal, the signal given by equation (9) is also a two-dimensional signal.

The transmission path estimator 104 receives the reception signal through the input terminal T2, which is received by using an antenna different from that used for the reception signal 101, and performs a correlation computation with a 11-bit pseudo-random code in the same manner as described above, thereby obtaining an impulse response sequence in the transmission path.

Figure 2:
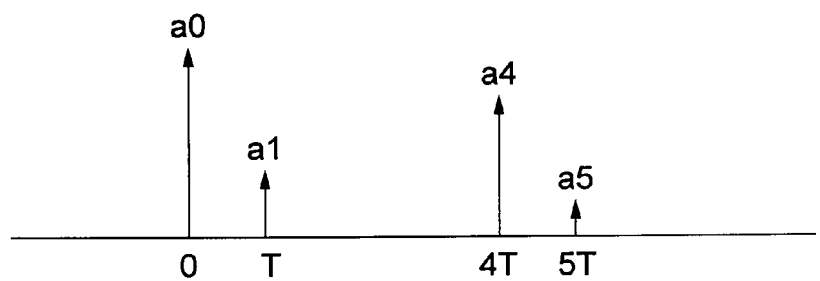
FIGS. 2 and 3 are charts for explaining conventional impulse response sequences in transmission paths.
Figure 3:
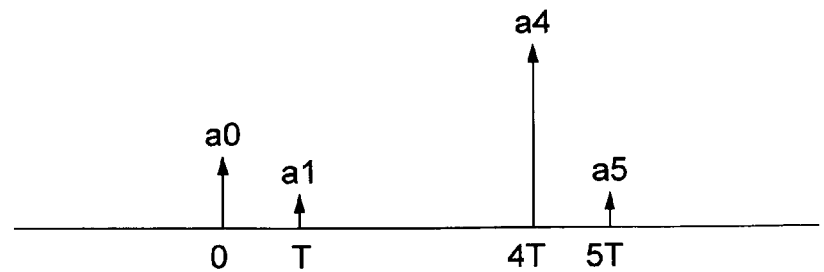
Figure 4:
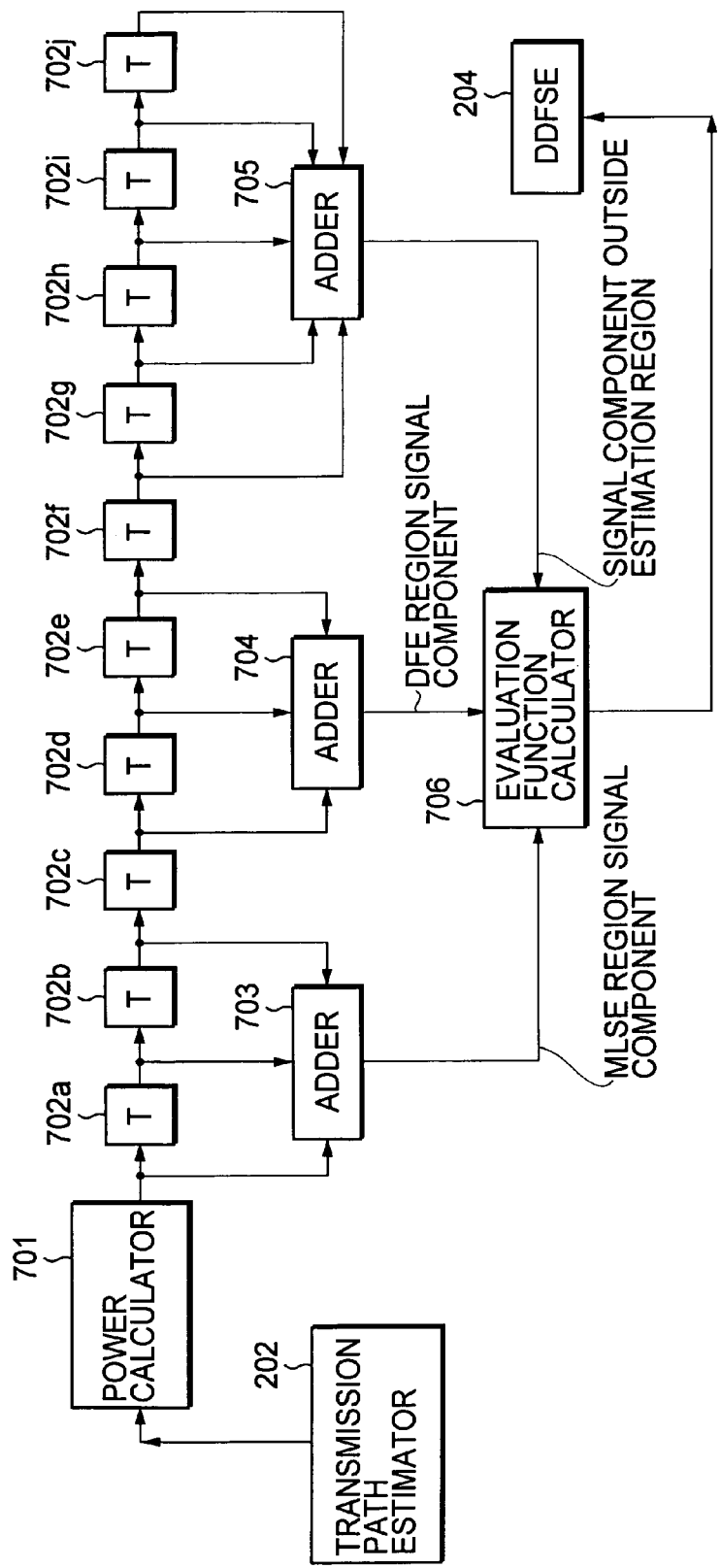
FIG. 4 is a block diagram showing the detailed arrangement of an estimation region detector in the prior art.

Assume that the impulse response sequence obtained by the transmission path estimator 103 from the reception signal is the sequence shown in FIG. 2, and the impulse response sequence obtained by the transmission path estimator 104 from the reception signal 102 is the sequence shown in FIG. 3.

The delayed wave detector 105 detects the timing, real component, and imaginary component of a4 in FIG. 2 which is the component having the largest amplitude in the delayed wave sequence. In this case, the timing is represented by m1, and the component is represented by p1+j×q1. Note that j is an imaginary unit.

Figure 6:
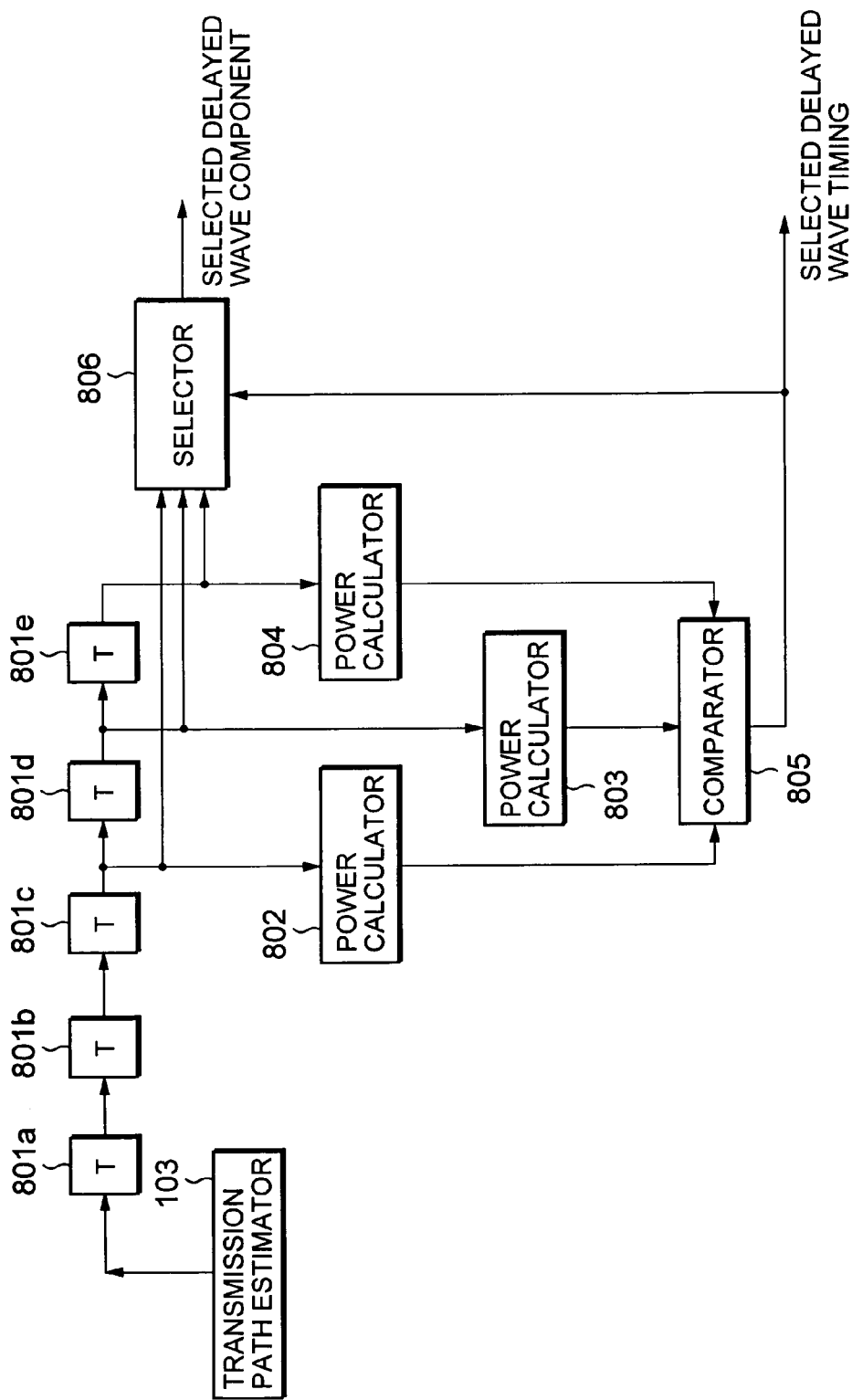
FIG. 6 is a block diagram showing the detailed arrangement of a delayed wave detector in the embodiment of the present invention in FIG. 5.

FIG. 6 shows an example of the arrangement of the delayed wave detector 105.

The two-dimensional impulse response sequence value input from the transmission path estimator 103 is shifted at a symbol cycle by using shift registers 801*a* to 801*e*.

The magnitudes of impulse responses at three symbols, i.e., the fourth to sixth symbols, of the signal input from the transmission path estimator 103 are compared with each other.

The impulse response value at the fourth symbol is output from the shift register 801*c*, and its power level is obtained by a power calculator 802. The impulse response value at the fifth symbol is output from the shift register 801*d*, and its power level is obtained by a power calculator 803. The impulse response value at the sixth symbol is output from the shift register 801*e*, and its power level is obtained by a power calculator 804.

The power levels at the fourth, fifth, and sixth symbols, respectively obtained by the power calculators 802, 803, and 804, are compared by a comparator 805 to determine a specific symbol at which the highest level is obtained. The corresponding information (timing m1) is output to a selector 806. The selector 806 outputs the component (p1+j×q1) having the largest amplitude among the components at the fourth, fifth, and sixth symbols in the impulse response sequence.

The other delayed wave detector 106 has the same arrangement as that of the delayed wave detector 105. The delayed wave detector 106 obtains the timing, real component, imaginary component of a4 in FIG. 3. In this case, the timing is represented by m2, and the component is expressed by p2+j×q2 as a complex number.

The delayed wave canceler 107 generates an impulse response sequence by canceling the largest component of a delayed wave using the output signals from the delayed wave detectors 105 and 106. This computation is performed as follows.

The impulse response sequence output from the transmission path estimator 103 is represented by h1(k), and the impulse response sequence output from the transmission path estimator 104 is represented by h2(k). In this case, k represents the timing of symbol periods and takes an integer from 0 to 10. Letting dm be the difference between a timing m1 and a timing m2, the computation by the delayed wave canceler 107 is expressed as $$h1(k) \times (p2+j \times q2) - h2(k-dm) \times (p1+j \times q1) \quad (10)$$

In mathematical expression (10), (k−dm) is the remainder of 11.

Figure 8:
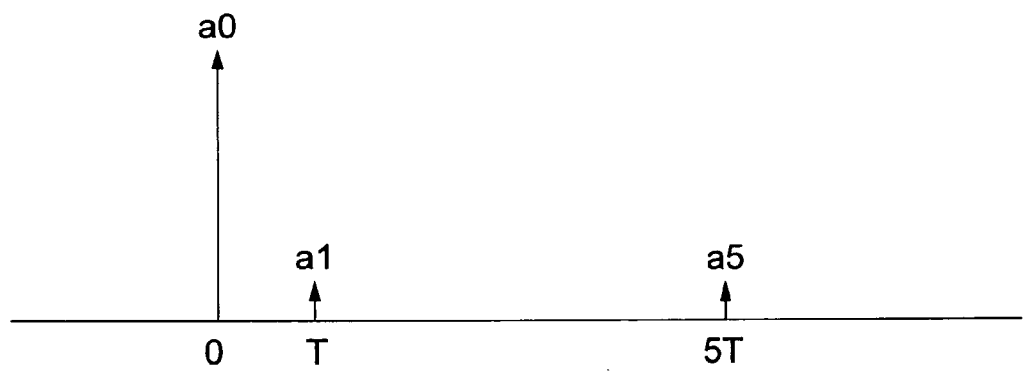
FIGS. 8 and 9 are charts for explaining the impulse response sequences output from the delayed wave canceler according to the embodiment of the present invention in FIG. 5.

The computation result on mathematical expression (10) becomes a new impulse response sequence. FIG. 8 shows such a case.

When the component having the largest amplitude among delayed wave components is canceled, the ratio of a delayed component to a corresponding direct wave component increases, and high signal estimation ability can be obtained.

Figure 7:
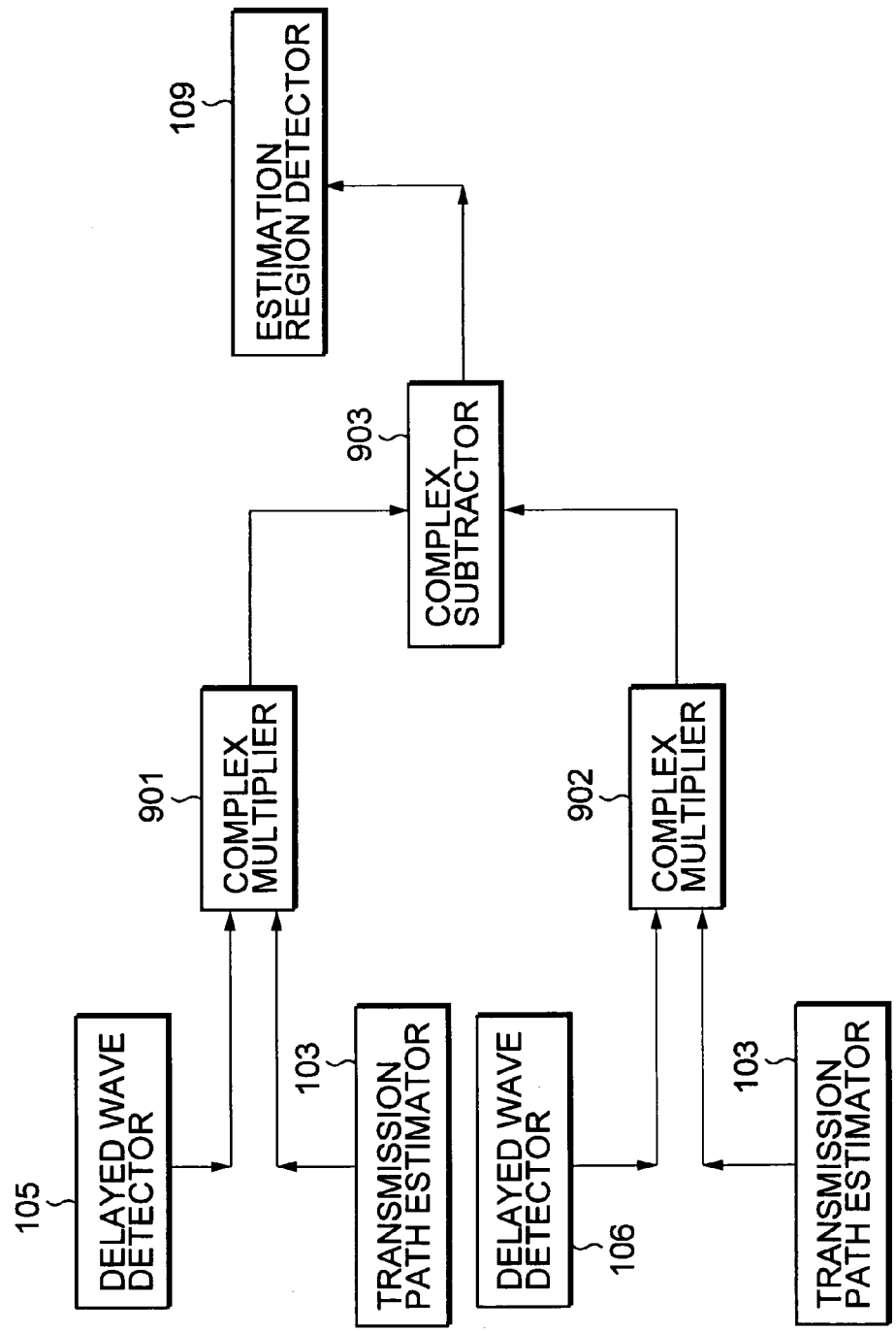
FIG. 7 is a block diagram showing the detailed arrangement of a delayed wave canceler according to the embodiment of the present invention in FIG. 5.

FIG. 7 shows an example of the arrangement of the delayed wave canceler 107.

A computation based on mathematical expression (10) can be performed by using a complex multiplier 901, complex multiplier 902, and complex subtractor 903, and an impulse response sequence obtained by canceling the delayed wave component having the largest amplitude can be output.

The new impulse response sequence is obtained by the delayed wave canceler 107. A new reception signal must be obtained accordingly. Letting S1(k) be the reception signal 101, and S2(k) be the reception signal 102, the output signal from the delayed wave canceler 108 is given by $$S1(k) \times (p2+j \times q2) - S2(k-dm) \times (p1+j \times q1) \quad (11)$$

The delayed wave canceler 108 can be implemented by the same arrangement as that of the delayed wave canceler 107.

Figure 1:
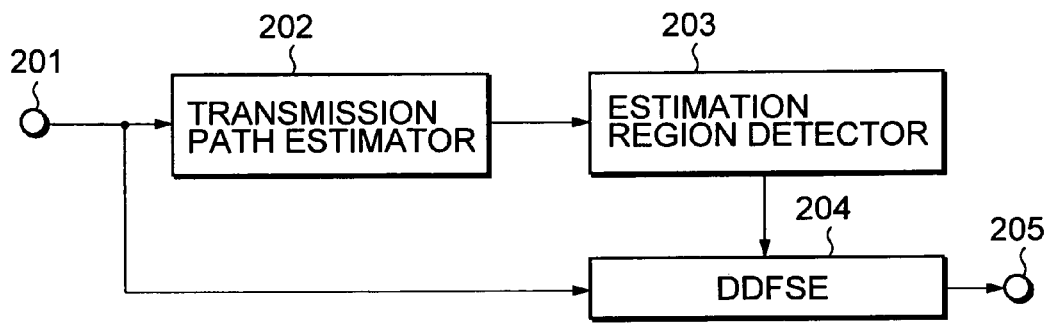
FIG. 1 is a block diagram showing the arrangement of a conventional delayed decision feedback sequence estimation diversity receiver having a timing control function.
Figure 9:
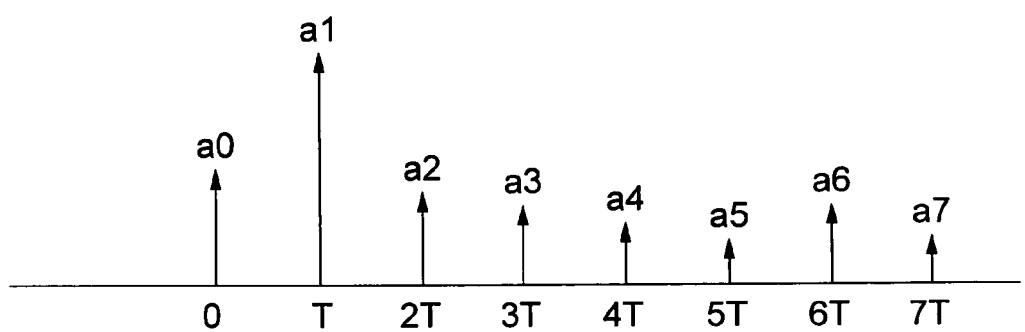

In order to perform signal estimation in the DDFSE 110, an optimal timing must be determined. If only three components have certain amplitude values as shown in FIG. 8, it is not difficult to find a timing so as to set a0 and a1 in the MLSE region. If, however, eight components have certain amplitudes as shown in FIG. 9, the present invention requires the same function as that of the estimation region detector 203 in FIG. 1, which is used in the prior art. As this function, the estimation region detector 109 obtains an optimal timing based on the impulse response sequence newly obtained by the delayed wave canceler 107.

The DDFSE 110 performs signal estimation upon receiving the impulse response sequence output from the delayed wave canceler 107, the reception signal output from the delayed wave canceler 108, and the timing signal output from the estimation region detector 109. The estimation result is output as a decision result 111 from an output terminal T3 (shown in FIG. 5).

Only the preferred embodiment of the present invention has been exemplified above. However, the present invention is not limited to this. Persons skilled in the art easily recognize that various changes and modifications can be made within the spirit and scope of the invention.

What is claimed is:

1. A delayed decision feedback sequence estimation diversity receiver comprising:

means for extracting a plurality of reception signals by using a plurality of antennas when estimating a transmission signal from reception signals having undergone transmission path distortion;

means for combining impulse response sequences in transmission paths while canceling delayed wave components having the largest amplitudes in delayed wave component sequences in impulse response sequences in the respective transmission paths; and means for performing signal estimation on the basis of a new impulse response sequence generated by combining the impulse response sequences.

2. A delayed decision feedback sequence estimation diversity receiver comprising:

transmission path estimators for respectively obtaining transmission path impulse response sequences from a plurality of reception signals received through a plurality of antennas;

delayed wave detectors for respectively detecting components having the largest amplitudes from delayed wave component sequences in impulse response sequences as output signals from said transmission path estimators;

a first delayed wave canceler for outputting a new impulse response sequence obtained by combining the output signals from said transmission path estimators while canceling delayed wave components having the largest amplitudes on the basis of the output signals from said delayed wave detectors;

an estimation region detector for detecting a timing for signal estimation from the new combined impulse response sequence and outputting a timing signal;

a second delayed wave canceler for receiving the output signals from said delayed wave detectors and outputting a new combined reception signal obtained by combining the reception signals while canceling delayed wave components having the largest amplitudes; and a delayed decision feedback sequence estimator for performing signal estimation upon receiving the new combined reception signal, the new combined impulse response sequence, and the timing signal output from said estimation region detector, and outputting the estimation result.

3. A receiver according to claim 2, wherein signal estimation ability is improved by combining antenna diversity with said delayed decision feedback sequence estimator.

4. A receiver according to claim 3, wherein characteristics of said delayed decision feedback sequence estimator are improved by canceling the delayed wave components by using the antenna diversity and a main delayed wave component that becomes a cause for a deterioration in the characteristics of said delayed decision feedback sequence estimator.

5. A receiver according to claim 4, wherein said receiver further comprises means for canceling the delayed response characteristics of the respective reception signals, extracting components having the largest amplitudes among delayed wave components from the obtained impulse responses, and combining a new impulse response with the reception signal while canceling the extracted components, and said delayed decision feedback sequence estimator performs signal estimation after the new impulse response and the reception signal are combined.

6. A delayed decision feedback sequence estimation method comprising:

extracting a plurality of reception signals by using a plurality of antennas when estimating a transmission signal from a reception signal having undergone transmission path distortion;

combining impulse response sequences in transmission paths while canceling delayed wave components having the largest amplitudes in delayed wave component sequences in impulse response sequences in the respective transmission paths; and performing signal estimation on the basis of a new impulse response sequence generated by combining the impulse response sequences.

* * * * *